Jan. 8, 1957.  A. MADSEN  2,777,120
AIRCRAFT EXTERNAL LIGHTING SYSTEM
Filed March 22, 1955
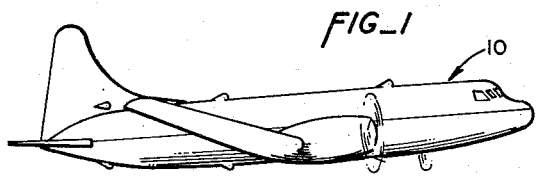
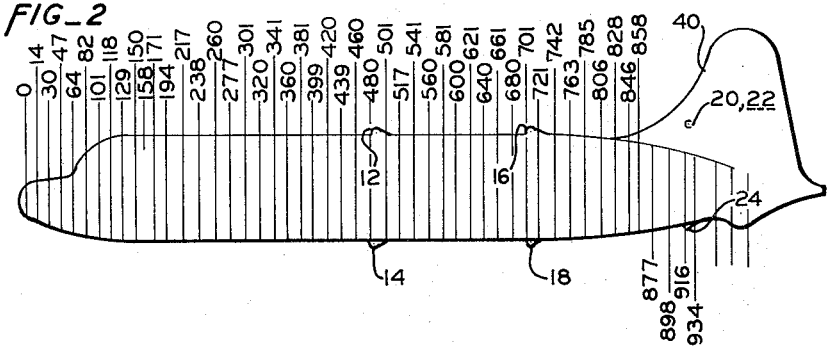
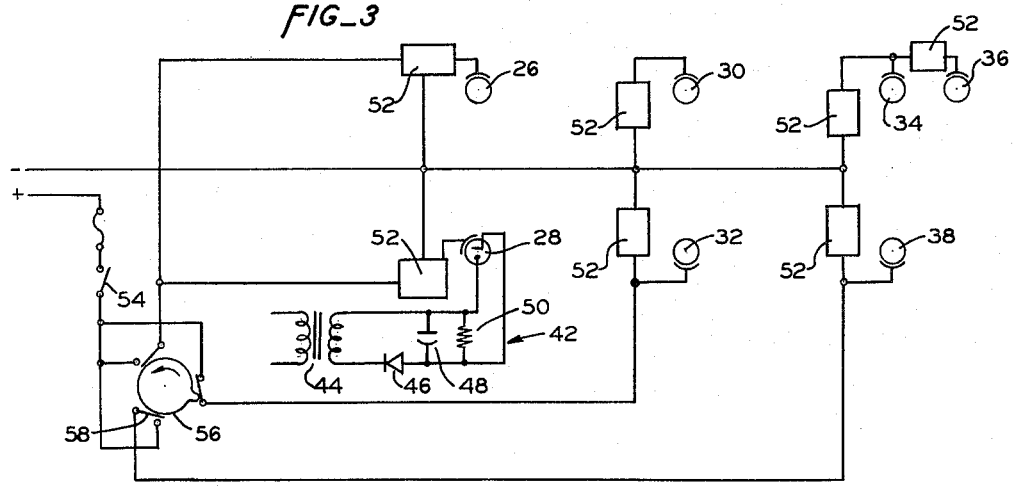
INVENTOR.
ANDREW MADSEN
BY Naylor & Neal
ATTORNEYS

United States Patent Office 2,777,120
Patented Jan. 8, 1957

2,777,120

AIRCRAFT EXTERNAL LIGHTING SYSTEM

Andrew Madsen, San Lorenzo, Calif., assignor to Transocean Air Lines, Oakland, Calif., a corporation of California Application March 22, 1955, Serial No. 495,925

7 Claims. (Cl. 340—82)

This invention relates to aircraft, and more particularly to an external lighting system of the flashing type for aircraft adapted to indicate to observers, particularly the pilots of other aircraft in the vicinity, the approximate rate of movement, the direction of movement, and the positional attitude of the aircraft in which the system is installed.

The essential purpose and object of the subject invention is to provide an aircraft external lighting system of the flashing type adapted to indicate the presence of an airplane over substantial distances and to also provide visual impression signals indicative of the rate and direction of movement of an airplane and its positional attitude.

A furher object of the invention is to provide an aircraft external lighting system adapted to serve as a positive recognition means for aircraft during daylight operation.

These and other objects and advantages are achieved broadly by the employment of a plurality of spaced pairs of light sources of extremely high intensity, such as electronic flash tubes, along the longitudinal axis of an aircraft, with each pair of light sources consisting of an upper source positioned at the top of an aircraft and a lower source positioned at the underside of the aircraft in vertical alignment with the upper source, and by causing the pairs of light sources to be sequentially energized in a rearward to forward direction at sequence time intervals on the order of the time of persistence of retinal impression characteristic of the human eye.

In the drawing:

Figure 1 is a view in perspective of an aircraft embodying the lighting system of the invention;

Figure 2 is an outline view of a DC-4 aircraft showing the placement position of the lights of the system with respect to the reference stations of the aircraft; and Figure 3 is a schematic diagram showing a general form of circuit arrangement for the lighting system.

With reference to the drawing, the aircraft 10, which by way of example is shown as a DC-4, is provided along its longitudinal axis with transparent housings 12, 14, 16, 18, 20, 22 and 24 enclosing electronic flash tubes 26, 28, 30, 32, 34, 36 and 38. Tubes 26 and 28 constitute a vertically aligned pair positioned at reference station 501. Tubes 30 and 32 constitute a vertically aligned pair positioned at reference station 721. Tubes 34 and 36 constitute a horizontally aligned pair disposed at opposite sides of vertical stabilizer 40, while tube 38 is disposed in vertical alignment with tubes 34 and 36 at reference station 916. The tube housings 12, 16, 20 and 22 are substantially in horizontal alignment with each other, and tube housings 14, 18 and 24 are likewise substantially in horizontal alignment with each other.

Each of the tubes is provided with a separate power circuit, such as that indicated generally at 42 for tube 28 in Figure 3. The individual power circuits comprise: a step-up power transformer 44 to raise the line voltage to the voltage necessary for flash tube operation; a rectifier 46 to convert the high voltage alternating current to high voltage direct current for the charging of condenser 48; and resistance 50 to provide an intermediate D. C. voltage for a triggering circuit and to dissipate any unused energy after the flashing of the tube.

Each of the power circuits, such as 42, has associated therewith a triggering circuit indicated schematically at 52 which, typically, may comprise a transformer and a condenser to provide the energy for the triggering pulse.

The circuit further comprises a control switch 54 adapted upon being closed to energize a motor, not shown, to rotate switch control means schematically indicated at 56 adapted during each revolution to sequentially close normally open switches 58, 60 and 62 to thereby effect, respectively, energization of tube groups 34—38, 30—32 and 26—28. Preferably, the arrangement of switches 58, 60 and 62 and the cyclically operable control means 56 therefor is such that the time interval between the flashing of adjacent tube pairs, or groups, is on the order of $\frac{1}{16}$th of a second, with such interval corresponding with the average duration of persistence of retinal impressions of the human eye, and such that a complete flashing sequence occurs approximately 40 times a minute. The tube pairs are spaced approximately fifteen feet apart.

The tube pair spacing and the time factors involved in a flashing sequence, together with the brief image retention by the eye of a tube pair flash, causes a flashing sequence to appear to the eye as two parallel lines of light rather than as three pairs of spot flashes. These light lines, due to the high intensity of the tube flashes, may be seen at great distances, e. g. 30 miles on clear nights and three miles in the daytime against a background of bright sky. The apparent size of the space between the two lines gives an indication to the observer of the distance away of the aircraft. The repetitive appearance of the light lines gives a clear indication of the direction of movement of the aircraft and its positional attitude.

Perhaps more importantly, the subject light system makes the airplane conspicuous to both air and ground observers. The high intensity of the lights together with their apparent motion to the eye quickly attract attention with respect to both ahead and side vision. The lights are clearly discernible even against the background of a brightly lit city. And they cannot be confused with ground lights, as is sometimes the case with conventional types of aircraft lights.

What is claimed is:

1. An external lighting system for aircraft comprising a plurality of electronic flash tubes disposed in longitudinally spaced and substantially aligned relation along the fuselage of an aircraft, and circuit means including control means therefor for said tubes adapted to sequentially fire the same in a rearward to forward direction with respect to the direction of movement of said aircraft and timed relation to each other.

2. An external lighting system for aircraft comprising a plurality of electronic flash tubes disposed in longitudinally spaced and substantially aligned relation along one of the upper and lower sides of the fuselage of an aircraft, and circuit means including control means therefor for said tubes adapted to sequentially fire the same in a rearward to forward direction with respect to the direction of movement of said aircraft.

3. An external lighting system for aircraft comprising a plurality of electronic flash tubes disposed in longitudinally spaced and substantially aligned relation along one of the upper and lower sides of the fuselage of an aircraft, power circuit means to fire said tubes, and timing means in switching control relation to said power circuit means operable to sequentially and cyclically cause said power circuit means to fire said tubes in a rearward to forward direction with respect to the direction of movement of said aircraft, with a time interval between the flashes of one cycle being approximately 1/16th of a second.

4. An external lighting system for aircraft comprising a plurality of pairs of vertically aligned electronic flash tubes disposed in longitudinally spaced relation along the upper and lower sides of the fuselage of an aircraft, and circuit means including control means therefor adapted to sequentially fire said pairs of tubes in a rearward to forward direction with respect to the direction of movement of said aircraft.

5. An external lighting system for aircraft comprising a plurality of pairs of vertically aligned electronic flash tubes disposed in centrally and longitudinally spaced relation along the upper and lower margins of the fuselage of an aircraft, with the tubes along said upper margin being disposed substantially in alignment with each other, and with the tubes along said lower margin being disopsed substantially in alignment with each other, power circuit means to fire said pairs of tubes, and timing means in switching control relation to said power circuit means operable to sequentially and cyclically cause said power circuit means to fire said pairs of tubes in a rearward to forward direction with respect to the direction of movement of said aircraft.

6. An external lighting system for aircraft as set forth in claim 5, wherein said timing means is operable to cause said power circuit means to fire said pairs of tubes with a time interval between the flashes of one cycle being approximately 1/16th of a second, and wherein said pairs of tubes are located approximately 15 feet apart.

7. An external lighting system for aircraft as set forth in claim 6, said timing means being further operable to cause said power circuit means to fire said pairs of tubes at the rate of approximately 40 cycles per minute.

References Cited in the file of this patent
UNITED STATES PATENTS

| | | |
|---|---|---|
| 1,264,485 | Brooke | Apr. 30, 1918 |
| 1,704,709 | Murray | Mar. 12, 1929 |
| 2,232,822 | Homsher | Feb. 25, 1941 |
| 2,365,038 | Adler | Dec. 12, 1944 |
| 2,478,908 | Edgerton | Aug. 16, 1949 |